(12) United States Patent
Yamazaki

(10) Patent No.: US 8,229,627 B2
(45) Date of Patent: Jul. 24, 2012

(54) VEHICLE STEERING APPARATUS

(75) Inventor: Ippei Yamazaki, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 609 days.

(21) Appl. No.: 12/090,100

(22) PCT Filed: Oct. 10, 2006

(86) PCT No.: PCT/JP2006/320517
§ 371 (c)(1),
(2), (4) Date: Apr. 14, 2008

(87) PCT Pub. No.: WO2007/043673
PCT Pub. Date: Apr. 19, 2007

(65) Prior Publication Data
US 2009/0157261 A1 Jun. 18, 2009

(30) Foreign Application Priority Data
Oct. 12, 2005 (JP) ................................. 2005-298073

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |

(52) U.S. Cl. ................ 701/41; 701/36; 701/42; 116/31; 180/400; 180/412; 180/416

(58) Field of Classification Search ................... 701/41, 701/42, 44; 116/31; 180/6.2, 6.28, 412, 180/413, 416, 443; 340/465
See application file for complete search history.

(56) References Cited

U.S. PATENT DOCUMENTS

| | | | | |
|---|---|---|---|---|
| 5,122,958 | A | * | 6/1992 | Eto et al. ........................ 701/41 |
| 6,854,559 | B2 | * | 2/2005 | Kurishige et al. ............. 180/446 |
| 7,406,373 | B2 | * | 7/2008 | Kubota et al. .................. 701/41 |
| 2006/0069481 | A1 | * | 3/2006 | Kubota et al. .................. 701/41 |

(Continued)

FOREIGN PATENT DOCUMENTS
DE 101 11 217 A1 2/2002
(Continued)

*Primary Examiner* — Jack W Keith
*Assistant Examiner* — Rami Khatib
(74) *Attorney, Agent, or Firm* — Oblon, Spivak, McClelland, Maier & Neustadt, L.L.P.

(57) ABSTRACT

A vehicle steering apparatus that can prevent a large returning torque from acting when a steering wheel is turned. Through processing of an assist control program, rotational torque (assist torque) of an electric motor is calculated by adding returning torque g·Trto to turning torque Tc (in actuality, subtracting the returning torque g·Trto from the turning torque Tc). The electric motor is driven and controlled in accordance with the calculated assist torque. When the steering torque is large, the calculated returning torque gain g decreases, and therefore, the returning torque g·Trto decreases or becomes zero. With this control, the greater the force (torque) required to operate the steering wheel, the smaller the influence of the returning torque, and steering feel at the time of turning the steering wheel is improved.

12 Claims, 4 Drawing Sheets

U.S. PATENT DOCUMENTS

2007/0100524 A1 * 5/2007 Sakaguchi et al. .............. 701/41

FOREIGN PATENT DOCUMENTS

| JP | 5 155352 | 6/1993 |
|---|---|---|
| JP | 2001 278084 | 10/2001 |
| JP | 2002 145095 | 5/2002 |
| JP | 2002 145101 | 5/2002 |
| JP | 2004 276805 | 10/2004 |
| JP | 2005 200019 | 7/2005 |

* cited by examiner

VEHICLE STEERING APPARATUS

TECHNICAL FIELD

The present invention relates to a vehicle steering apparatus, and more particularly to a vehicle steering apparatus which includes a so-called power steering apparatus; i.e., an apparatus for assisting turning of turnable wheels that is performed in accordance with a steering operation.

BACKGROUND ART

Conventionally, there have been well known a vehicle steering apparatus which includes a so-called power steering apparatus; i.e., an apparatus for assisting turning of turnable wheels that is performed in accordance with a steering operation of a steering wheel. Known examples of such a power steering apparatus include a hydraulic power steering apparatus which generates steering assist torque by means of a hydraulic actuator, and an electric power steering (EPS) apparatus which generates steering assist torque by means of an electric actuator such as an electric motor. In particular, in recent years, electric power steering apparatuses have drawn attention, because they can be easily mounted on a vehicle and can improve fuel consumption.

Various techniques have been proposed for power steering apparatuses so as to improve their steering performance. For example, Japanese Patent Application Laid-Open (kokai) No. 2002-145101 describes a technique relating to return control performed when a steering wheel is returned from a steered position to a neutral position. In the return control, returning torque is set such that the greater the steering angle speed, the smaller the returning torque, to thereby improve convergence at the time the steering wheel returns to the neutral position.

However, in the above-described patent document 1, since the returning torque is set in accordance with steering angle speed, a large returning torque may be applied when the steering wheel is turned. Accordingly, in such a case, there arises a problem in that the returning torque serves as resistance when the steering wheel is turned, so that the feel of steering deteriorates.

DISCLOSURE OF THE INVENTION

The present invention has been accomplished to solve the above-described problem, and an object of the present invention is to provide a vehicle steering apparatus which can prevent a large returning torque from acting when a steering wheel is turned, to thereby improve the feel of steering.

In order to achieve the above object, the present invention provides a vehicle steering apparatus including an actuator for assisting steering operation of a steering wheel, the apparatus comprising a steering-torque sensor for detecting steering torque input from the steering wheel; returning-torque determination means for determining a returning torque for assisting the steering operation when the steering wheel is returned such that the returning torque decreases as the absolute value of the steering torque detected by the steering-torque sensor increases; and drive control means for driving and controlling the actuator in accordance with the returning torque determined by the returning-torque determination means.

According to the present invention, the returning-torque determination means sets the returning torque such that the greater the absolute value of the steering torque, the smaller the returning torque. Therefore, when the steering torque with which the steering wheel is turned is large, the returning torque serving as a resistance becomes small. That is, the greater the force (torque) required to operate the steering wheel, the smaller the influence of the returning torque. Accordingly, the steering feel at the time of turning the steering wheel is improved.

Preferably, the returning-torque determination means determines the returning torque such that the returning torque decreases as the steering torque increases as described above, and increases as the steering angle of the steering wheel increases. Through being set in this manner, the returning torque can be controlled in accordance with the steering torque and the steering angle. For example, when the steering angle is large and the steering torque is small (e.g., when the operation of the steering wheel is switched from a turn operation to a return operation), there is demanded a control which places priority on a control for returning the steering wheel to the neutral position. In the present invention, the returning torque is increased in such a case, whereby the steering wheel can be quickly returned to the neutral position.

Preferably, the returning-torque determination means includes reference-returning-torque determination means for determining a torque which serves as a reference of the returning torque such that the torque increases as steering angle detected by a steering angle sensor increases; and returning-torque-gain determination means for determining a gain associated with the reference returning torque such that the gain decreases as the absolute value of the steering torque detected by the steering-torque sensor increases, wherein the returning torque is determined on the basis of the torque determined by the reference-returning-torque determination means and the gain determined by the returning-torque-gain determination means. By virtue of this configuration, it becomes possible to determine the returning torque by multiplying the reference returning torque determined by the reference-returning-torque determination means and the gain (returning torque gain) determined by the returning-torque-gain determination means. Thus, the returning torque can be set in consideration of not only the influence of the steering torque but also that of the steering angle. In this case, the value of the returning torque gain may be set within an arbitrary positive number range; for example, within a range of 0 to 1. Further, the returning torque gain may be set such that the returning torque gain is decreased as the absolute value of detected steering torque increases, and set to zero when the steering torque assumes a predetermined value or greater.

Preferably, the vehicle steering apparatus of the present invention further comprises turning-torque determination means for determining a turning torque for assisting the steering operation when the steering wheel is turned such that the turning torque increases as the steering torque detected by the steering-torque sensor increases, wherein the drive control means drives and controls the actuator in accordance with the turning torque determined by the turning-torque determination means and the returning torque determined by the returning-torque determination means. With this configuration, the actuator is driven and controlled in accordance with not only the determined turning torque but also the determined returning torque. At both the time of turning the steering wheel and the time of returning the steering wheel, it is possible to execute steering assist which is balanced in consideration of the steering feel at the time of turning and convergence at the time of returning. In this case, preferably, assist-torque determination means is provided so as to determine an assist torque on the basis of the turning torque determined by the turning-torque determination means and the returning torque determined by the returning-torque determination means, wherein the drive control means drives and controls the actuator in accordance with the assist torque determined by the assist-torque determination means. Notably, the turning-torque determination means may determine the turning torque such that the turning torque increases with the detected steering torque and assumes a constant value when the detected steering torque assumes a predetermined value or greater. Further, the turning-torque determination means may use vehicle speed as a parameter and determine the turning torque such that the lower the vehicle speed, the greater the turning torque.

BEST MODE FOR CARRYING OUT THE INVENTION

Figure 1:
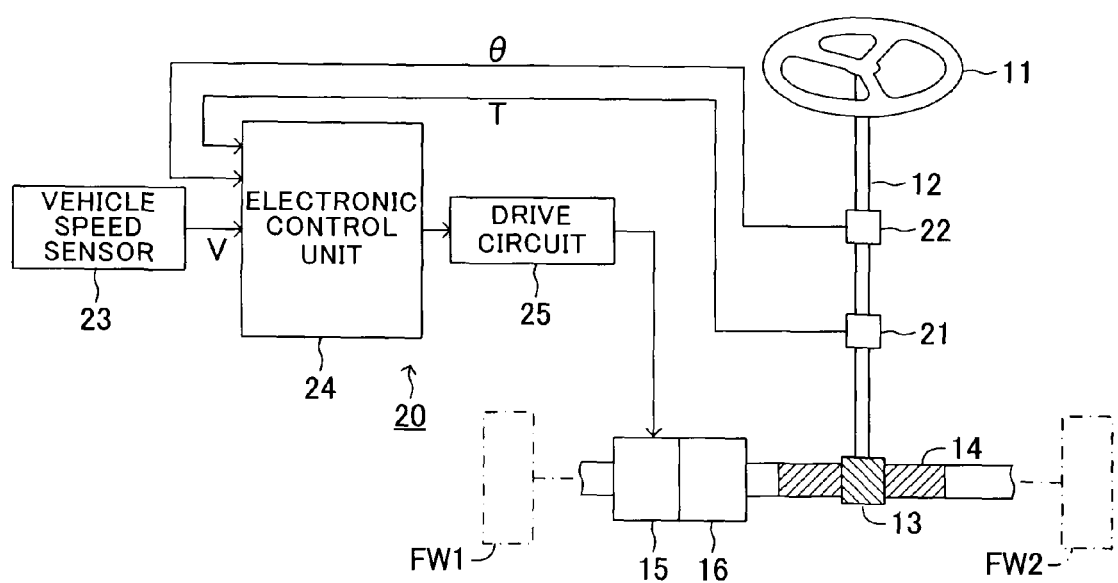
FIG. 1 is an overall schematic diagram of a vehicle steering apparatus according to an embodiment of the present invention, the apparatus having a function of assisting steering operation by a driver.

Below, an embodiment of the invention will be described with reference to the drawings. FIG. 1 is an overall schematic diagram of a vehicle steering apparatus according to the present embodiment, the apparatus having a function of assisting steering operation by a driver.

This vehicle steering apparatus includes a steering shaft 12 whose upper end is connected to a steering wheel 11 for integral rotation therewith. A pinion gear 13 is connected to the lower end of the shaft 12 for integral rotation therewith. The pinion gear 13 is in meshing engagement with rack teeth formed on a rack bar 14, and constitutes a rack and pinion mechanism in cooperation with the rack bar 14. Left and right front wheels FW1 and FW2 are steerably connected to opposite ends of the rack bar 14. The left and right front wheels FW1 and FW2 are turned leftward or rightward in accordance with an axial displacement of the rack bar 14 resulting from rotation of the steering shaft 12 about its axis. An electric motor 15 for steering assist is assembled to the rack bar 14. Rotation of the electric motor 15 is reduced and is converted to rectilinear motion of the rack bar 14 by means of a ball-screw mechanism 16 serving as a speed reducer.

Next, an electric control apparatus 20 for controlling operation of the electric motor 15 will be described. The electric control apparatus 20 includes a steering torque sensor 21, a steering angle sensor 22, and a vehicle speed sensor 23. The steering torque sensor 21 is assembled to the steering shaft 12. Input torque; i.e., torque which is input by a driver through steering operation of the steering wheel 11 acts on the steering shaft 12. Therefore, the torque acting on the steering shaft 12 is detected by the steering torque sensor 21 as steering torque T. Notably, the steering torque T assumes a positive value when the steering wheel 11 is steered in the right direction (clockwise direction) and a negative value when the steering wheel 11 is steered in the left direction (counterclockwise direction).

Like the steering torque sensor 21, the steering angle sensor 22 is also assembled to the steering shaft 12. The steering angle sensor 22 detects a steering angle θ of the steering wheel 11 on the basis of an angle of rotation of the steering shaft 12 resulting from the steering operation of the steering wheel 11. Notably, the steering angle θ represents a rotation angle of the steering wheel 11 in the right direction (clockwise direction) by a positive value, and represents a rotation angle of the steering wheel 11 in the left direction (counterclockwise direction) by a negative value. The vehicle speed sensor 23 detects vehicle speed V and outputs the same.

Figure 2:
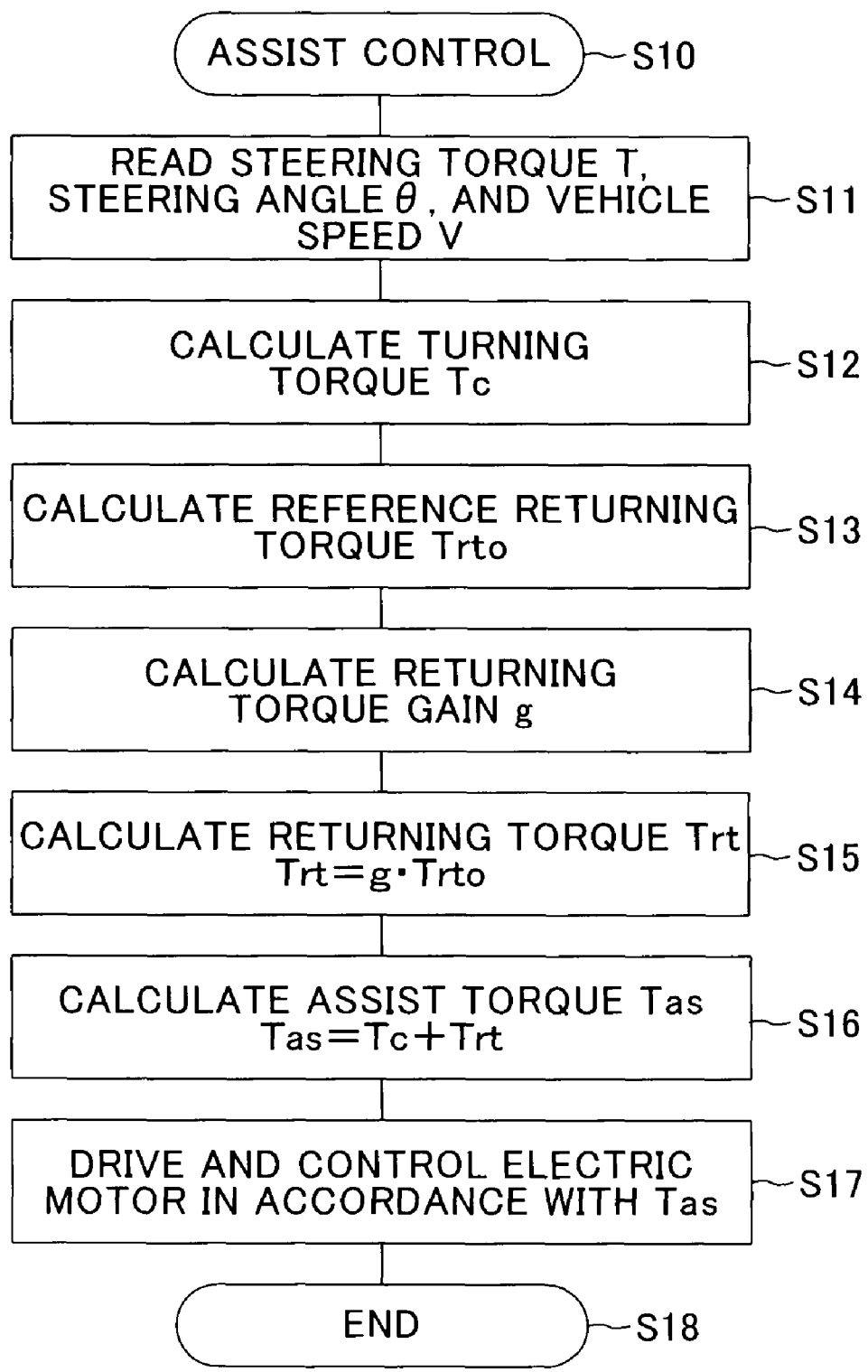
FIG. 2 is a flowchart of an assist control program executed by an electronic control unit of FIG. 1.

Further, the electric control apparatus 20 includes an electronic control unit 24, which is connected to the steering torque sensor 21, the steering angle sensor 22, and the vehicle speed sensor 23. The electronic control unit 24 is mainly composed of a microcomputer including a CPU, ROM, RAM, and the like. The electronic control unit 24 drives and controls the electric motor 15 via a drive circuit 25 by executing an assist control program of FIG. 2. The drive circuit 25 supplies to the electric motor 15 drive current designated by the electronic control unit 24.

Next, operation of the present embodiment having the above-described configuration will be described. When an ignition switch is turned on, the electronic control unit 24 starts to repeatedly execute the assist control program at predetermined short time intervals. The execution of the assist control program is started in step S10 of FIG. 2. In step S11, the electronic control unit 24 receives the steering torque T, the steering angle θ, and the vehicle speed V from the steering torque sensor 21, the steering angle sensor 22, and the vehicle speed sensor 23.

Figure 3:
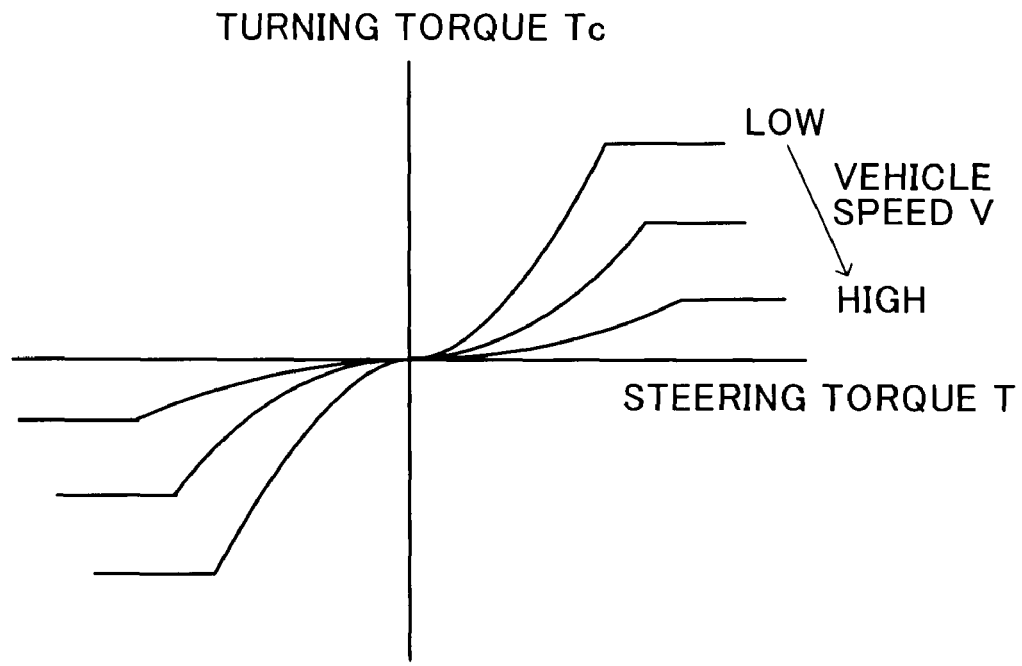
FIG. 3 is a graph showing the relation among steering torque, vehicle speed, and turning torque, the graph representing a turning-torque command value table used in the embodiment.

Next, in step S12, the electronic control unit 24 calculates a turning torque Tc, which changes in accordance with the steering torque T and the vehicle speed V, with reference to a turning-torque command value table provided in the ROM. FIG. 3 shows the turning-torque command value table. This turning-torque command value table stores, for each of a plurality of representative vehicle speeds, a plurality of values of turning torques Tc determined in accordance with the steering torque T. As can be understood from FIG. 3, the turning torque Tc increases nonlinearly as the steering torque T increases in the positive direction, and assumes a constant value when the steering torque T reaches a predetermined value. Further, the turning torque Tc decreases (increases in the negative direction) nonlinearly as the steering torque T increases in the negative direction, and assumes a constant value when the steering torque T reaches a predetermined value. For a given steering torque T, the lower the vehicle speed V, the greater the turning torque Tc. Instead of utilizing this turning-torque command value table, the turning torque Tc, which changes in accordance with the steering torque T and the vehicle speed V, may be defined in the form of a function in advance, and calculated by use of the function. Notably, in FIG. 3, when the steering torque T represented by the horizontal axis is positive, it represents a steering torque applied when the steering wheel 11 is turned in the right direction (clockwise direction); and when the steering torque T represented by the horizontal axis is negative, it represents a steering torque applied when the steering wheel 11 is turned in the left direction (counterclockwise direction). Further, when the turning torque Tc represented by the vertical axis is positive, it represents a turning torque which is applied so as to rotate the steering wheel 11 in the right direction (clockwise direction); and when the turning torque Tc represented by the vertical axis is negative, it represents a turning torque which is applied so as to rotate the steering wheel 11 in the left direction (counterclockwise direction). The processing of this step S12 corresponds to the turning-torque determination means of the present invention.

After the processing of step S12, in step S13, the electronic control unit 24 calculates a reference returning torque Trto, which changes in accordance with the steering angle θ, with reference to a reference-returning-torque command value table provided in the ROM. This reference returning torque Trto is a reference value of torque when the steering wheel 11 is returned from a rotated position (turned position) to the neutral position (at the time of return control), so as to assist the operation of returning the steering wheel 11 toward the neutral position. The reference returning torque Trto is always applied in a direction opposite the steering direction. Therefore, the reference returning torque Trto is always applied in a direction opposite the direction of the turning torque Tc, which is applied in the steering direction, and serves as a resistance against the turn operation.

Figure 4:
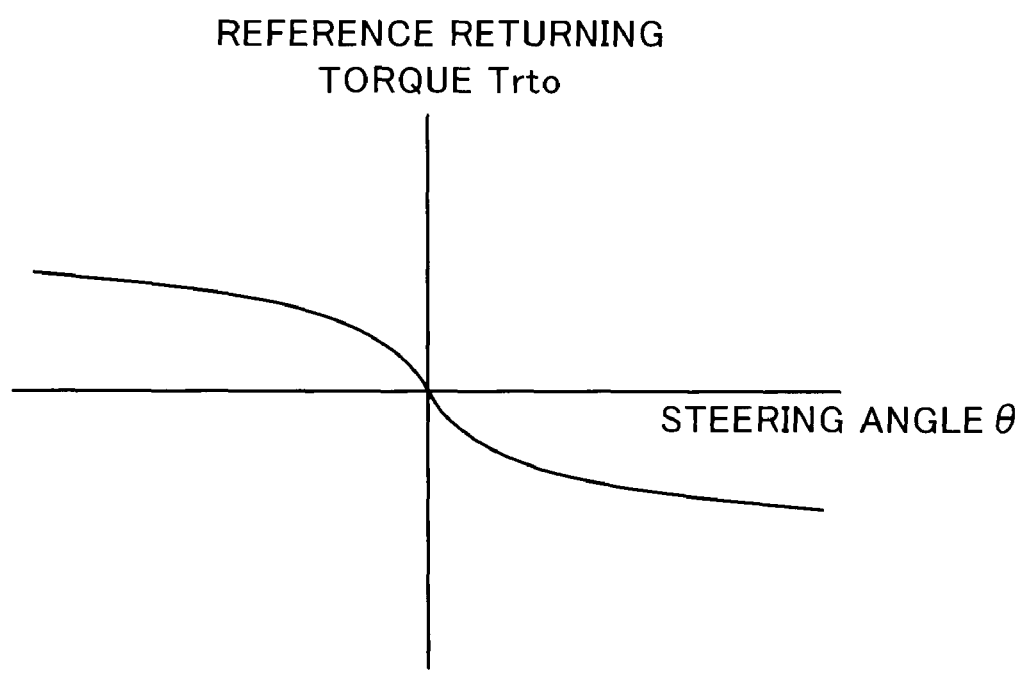
FIG. 4 is a graph showing the relation between steering angle and reference returning torque, the graph representing a reference-returning-torque command value table used in the embodiment.

FIG. 4 shows the reference-returning-torque command value table. This reference-returning-torque command value table stores a plurality of values of the reference returning torque Trto determined in accordance with the steering angle θ. As can be understood from FIG. 4, the reference returning torque Trto increases nonlinearly in the negative direction (decreases in the positive direction) as the steering angle θ increases in the positive region. Further, the reference returning torque Trto increases nonlinearly in the positive direction (decreases in the negative direction) as the steering angle θ increases in the negative region. Notably, in FIG. 4, when the steering angle θ represented by the horizontal axis is positive, it represents a steering angle at the time when the steering wheel 11 is rotated in the right direction (clockwise direction) from the neutral position; and when the steering angle θ represented by the horizontal axis is negative, it represents a steering angle at the time when the steering wheel 11 is rotated in the left direction (counterclockwise direction) from the neutral position. Further, when the reference returning torque represented by the vertical axis is positive, it represents a torque which is applied so as to rotate the steering wheel 11 in the right direction (clockwise direction); and when the reference returning torque represented by the vertical axis is negative, it represents a turning torque which is applied so as to rotate the steering wheel 11 in the left direction (counterclockwise direction). That is, for the torques represented by the vertical axes of FIGS. 3 and 4, the polarity is determined on the basis of the same criteria. As described above, the reference returning torque is a torque which is applied in a direction for returning the steering wheel 11 to the neutral position, and acts in a direction opposite the direction of the turning torque. Therefore, the reference returning torque assumes a negative value when the steering wheel 11 has been turned in the right direction from the neutral position (a region of FIG. 4 in which the steering angle is positive), and assumes a positive value when the steering wheel 11 has been turned in the left direction from the neutral position (a region of FIG. 4 in which the steering angle is negative). Although the reference returning torque assumes a positive or negative value depending on the direction of rotation of the steering wheel 11, the absolute value of the reference returning torque is determined such that the greater the absolute value of the steering angle, the greater the absolute value of the reference returning torque. The processing of this step S13 corresponds to the reference-returning-torque determination means of the present invention.

When the absolute value of the steering angle θ is large, a long time is likely to be required to return the steering wheel to the neutral position. Therefore, in the reference-returning-torque command value table of FIG. 4, the greater the steering angle θ, the greater the value to which the reference returning torque Trto is set, whereby the returning torque at the time of large steering angle is increased. Further, when the steering angle θ is small, the stability associated with straight travel must be improved. Therefore, in the reference-returning-torque command value table of FIG. 4, the smaller the steering angle θ, the smaller the value to which the reference returning torque Trto is set, whereby unnecessary steering operation is prevented from being performed when the steering angle is small. Instead of utilizing this reference returning-torque command value table, the reference returning torque Trto, which changes in accordance with the steering angle θ, may be defined in the form of a function in advance, and calculated by use of the function.

Figure 5:
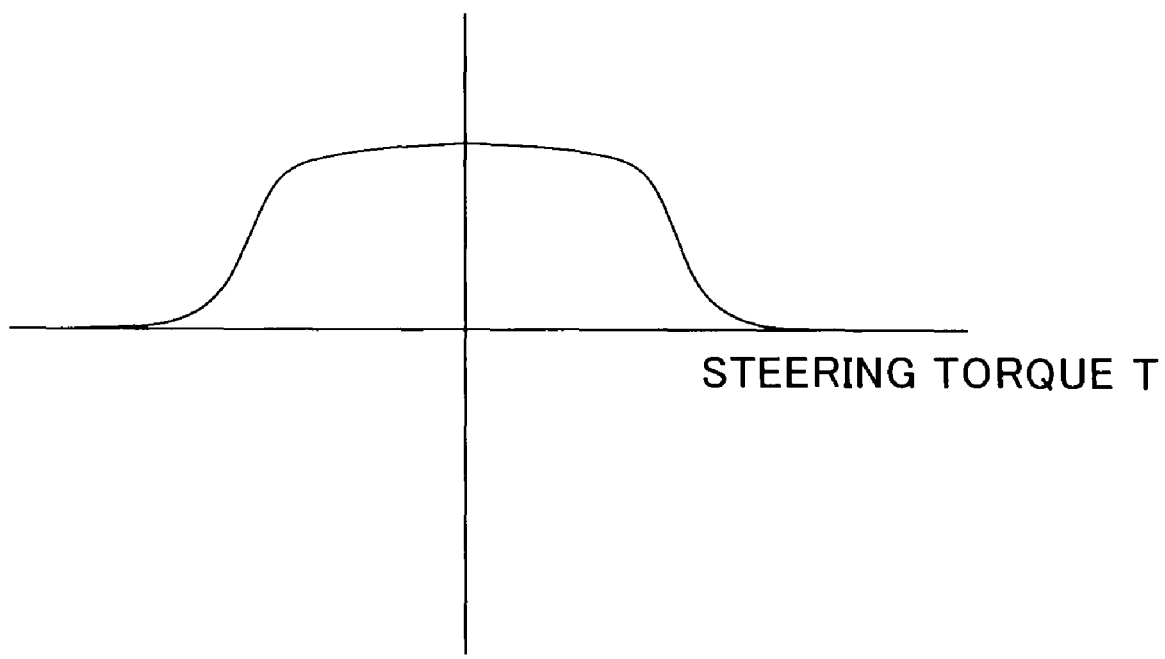
FIG. 5 is a graph showing the relation between steering torque and returning torque gain, the graph representing a returning-torque-gain command value table used in the embodiment.

After the calculation of the reference returning torque Trto, the electronic control unit 24 calculates a returning torque gain g in step S14. The returning torque gain g changes in accordance with the steering torque T, with reference to a returning-torque-gain command value table provided in the ROM. This returning torque gain g is a gain associated with the returning torque Trto calculated in step S13. FIG. 5 shows the returning-torque-gain command value table. This returning-torque-gain command value table stores a plurality of values of the returning torque gain g determined in accordance with the steering torque T. As can be understood from FIG. 5, the returning torque gain g is a positive value or zero, and decreases nonlinearly as the absolute value of the steering torque T increases. That is, the returning torque gain is determined such that the returning torque gain decreases as the detected steering torque increases. Further, the returning torque gain g is set to zero, when the steering torque assumes a predetermined value (absolute value) or greater. Instead of utilizing this returning-torque-gain command value table, the returning torque gain g, which changes in accordance with the steering torque T, may be defined in the form of a function in advance, and calculated by use of the function. The processing of this step S14 corresponds to the returning-torque-gain determination means of the present invention.

Next, in step SI5, the electronic control unit 24 calculates a returning torque Trt. This returning torque Trt is calculated by multiplying the reference returning torque Trto calculated in step S13 and the returning torque gain g calculated in step S14. The processing of this step S15 corresponds to the returning-torque determination means of the present invention.

Subsequently, the electronic control unit 24 calculates an assist torque Tas in step S16. This assist torque Tas is calculated by adding the turning torque Tc calculated in step S12 and the returning torque Trt calculated in step S15.

In step S17, the electronic control unit 24 operates and controls the electric motor 15 via the drive circuit 25 such that the calculated assist torque Tas (=Tc+Trt) is generated. Specifically, the electronic control unit 24 outputs to the drive circuit 25 a current command value representing a current having a magnitude proportional to the assist torque Tas; and the drive circuit 25 supplies to the electric motor 15 a current having a magnitude designated by the current command value.

With this control, the electric motor 15 outputs, at its output shaft, a rotational torque equal to the assist torque Tas. This rotational torque is transmitted to the ball-screw mechanism 16. The ball-screw mechanism 16 reduces the rotation of the electric motor 15 and converts it to a rectilinear motion to thereby drive the rack bar 14 in the axial direction. As a result, the rotating operation of the steering wheel 11 by the driver is assisted by the electric motor 15, and the left and right front wheels FW1 and FW2 are turned by the steering force of the driver and the assisting force of the electric motor 15.

In the present embodiment which operates in a manner described above, by means of the processing of the above-described steps S12 to S16, the rotational torque (assist torque) of the electric motor 15 is calculated through addition of the turning torque Tc and the returning torque Trt. Since the returning torque Trt is a torque acting in the direction opposite the direction of the turning torque Tc, under the assumption that the turning torque Tc assumes a positive value, the returning torque Trt assumes a negative value. That is, in actuality, the above-described addition is subtraction, and the assist torque Tas becomes smaller in absolute value than the turning torque Tc.

Accordingly, when the returning torque Trt is large, the assist torque Tas becomes small, so that a larger force (torque) by the driver must be applied to the steering wheel. Generally, many drivers desire that when they start to turn the steering wheel, the assist torque Tas is increased so as to enable them to turn the steering wheel with a small force. If the assist torque Tas decreases at that time, the driver is forced to apply a large force to the steering wheel so as to start the steering operation, so that the steering feel deteriorates. In this regard, in the present embodiment, when the steering torque is large, the returning torque gain g calculated in step S14 decreases or becomes zero, so that the returning torque Trt decreases or becomes zero. Therefore, the greater the force (torque) required for steering operation of the steering wheel, the smaller the influence of the returning torque. Accordingly, the driver is not forced to apply a large force as described above, so that the steering feel at the time of turning the steering wheel is improved. As described above, according to the present embodiment, the returning torque can be set in consideration of both the steering torque and the steering angle.

Further, in the present embodiment, the reference returning torque Trto is controlled while being related to the steering angle θ (specifically, controlled such that the reference returning torque increases as the steering angle increases). Therefore, the returning torque can be controlled in accordance with the steering angle θ. For example, when the steering angle θ is large and the steering torque T is small (e.g., when the operation of the steering wheel 11 is switched from a turn operation to a return operation), there is demanded a control which places priority on a control for returning the steering wheel 11 to the neutral position. In the present invention, in such a case, since the reference returning torque Trto is set to assume a large value, the returning torque increases, whereby the driver can quickly return the steering wheel 11 to the neutral position.

In the above, the embodiment of the present invention has been described; however, the present invention should not be limited to the above-described embodiment. For example, the above-described embodiment exemplifies a rack-assist-type electric power steering apparatus in which the electric motor 15 drives the rack bar 14 so as to assist steering operation of the steering wheel 11. However, it is apparent that the present invention can be practiced in any of a column-assist-type electric power steering apparatus in which the steering shaft 12 is driven about its axis so as to assist steering operation of the steering wheel 11 and a pinion-assist-type electric power steering apparatus in which a pinion of a steering gear box is driven by an electric motor.

The above-described embodiment exemplifies a case in which the returning torque Trt is calculated through multiplying the reference returning torque Trto by the returning torque gain g. However, the returning torque may be calculated in accordance with any of other calculation schemes, so long as the relation between the steering torque T and the returning torque Trt such that the returning torque Trt decreases as the steering torque T increase is maintained. For example, there may be employed a scheme in which a table showing the relation between returning torque and steering torque is prepared in advance, and a value of returning torque corresponding to each value of steering torque is determined in advance. However, in the scheme of the above-described embodiment, the reference returning torque itself can be controlled by other parameters (e.g., the reference returning torque can be controlled by the steering angle as in the above-described embodiment), so that flexible steering control can be performed under various conditions.

In the present embodiment, the reference returning torque Trto is set such that it increases as the steering angle θ increases. However, the reference returning torque Trto may depend on parameters representing steering conditions other than the steering angle θ. When the reference returning torque Trto is determined on the basis of parameters representing various steering conditions, advantageously, the optimal returning torque corresponding to various steering conditions can be set.

The invention claimed is:

1. A vehicle steering apparatus including an actuator for assisting steering operation of a steering wheel, the apparatus comprising:
   a steering-torque sensor for detecting steering torque input from the steering wheel;
   returning-torque determination means for determining a returning torque based on the steering torque detected by the steering-torque sensor and a steering angle of the steering wheel for assisting the steering operation when the steering wheel is returned such that the returning torque decreases as the absolute value of the steering torque detected by the steering-torque sensor increases and the returning torque increases as the steering angle increases; and
   drive control means for driving and controlling the actuator in accordance with the returning torque determined by the returning-torque determination means,
   wherein the returning-torque determination means includes reference-returning-torque determination means for determining a reference returning torque, which is a reference value of torque when the steering wheel is returned from a rotated position to a neutral position so as to assist returning of the steering wheel to the neutral position, based on the steering angle with reference to a reference-returning-torque command value table such that the reference returning torque increases as the steering angle increases and returning-torque-gain determination means for determining a gain associated with the reference returning torque based on the detected steering torque such that the gain decreases as the absolute value of the steering torque detected by the steering-torque sensor increases, and
   wherein the returning torque is determined on the basis of the reference returning torque determined by the reference-returning-torque determination means and the gain determined by the returning-torque-gain determination means.

2. A vehicle steering apparatus according to claim 1, further comprising a steering-angle detection sensor for detecting steering angle of the steering wheel, wherein the reference-returning-torque determination means determines the reference returning torque such that the reference returning torque increases as the steering angle detected by the steering-angle detection sensor increases.

3. A vehicle steering apparatus according to claim 2, further comprising:
turning-torque determination means for determining a turning torque based on the detected steering torque for assisting the steering operation when the steering wheel is turned such that the turning torque increases as the steering torque detected by the steering-torque sensor increases, wherein
the drive control means drives and controls the actuator in accordance with the turning torque determined by the turning-torque determination means and the returning torque determined by the returning-torque determination means.

4. A vehicle steering apparatus according to claim 1, further comprising:
turning-torque determination means for determining a turning torque based on the detected steering torque for assisting the steering operation when the steering wheel is turned such that the turning torque increases as the steering torque detected by the steering-torque sensor increases, wherein
the drive control means drives and controls the actuator in accordance with the turning torque determined by the turning-torque determination means and the returning torque determined by the returning-torque determination means.

5. A vehicle steering apparatus according to claim 4, further comprising a vehicle speed sensor for detecting a speed of the vehicle.

6. A vehicle steering apparatus according to claim 5, wherein the turning torque determined by the turning-torque determination means increases as the detected vehicle speed decreases for a given steering torque.

7. A vehicle steering apparatus according to claim 1, wherein the returning-torque-gain determination means determines the gain associated with the reference returning torque, without depending on the steering angle, such that the gain decreases as the absolute value of the steering torque detected by the steering-torque sensor increases.

8. A vehicle steering apparatus according to claim 7, wherein the returning-torque determination means determines the returning torque by multiplying together the torque determined by the reference-returning-torque determination means and the gain determined by the returning-torque-gain determination means.

9. A vehicle steering apparatus according to claim 1, wherein the returning-torque determination means determines the returning torque by multiplying together the torque determined by the reference-returning-torque determination means and the gain determined by the returning-torque-gain determination means.

10. A vehicle steering apparatus according to claim 1, wherein the reference returning torque determined by the reference-returning-torque determination means increases in a negative direction as the steering angle increases in a positive region.

11. A vehicle steering apparatus according to claim 10, wherein the reference returning torque determined by the reference-returning-torque determination means increases in a positive direction as the steering angle increases in a negative region.

12. A vehicle steering apparatus according to claim 1, wherein the returning torque-gain determination means sets the gain to zero when an absolute value of the detected steering angle torque is greater than a predetermined value.

* * * * *